United States Patent [19]
Jaksic

[11] Patent Number: 5,462,310
[45] Date of Patent: Oct. 31, 1995

[54] SEAT BELT CONSTRUCTION

[76] Inventor: Miroslav Jaksic, 4935 Fairways Dr., Brighton, Mich. 48116

[21] Appl. No.: 273,198

[22] Filed: Jul. 11, 1994

[51] Int. Cl.⁶ .................................................. B60R 22/00
[52] U.S. Cl. ............................................ 280/808; 280/803
[58] Field of Search ...................................... 280/803, 808

[56] References Cited

U.S. PATENT DOCUMENTS

| | | | |
|---|---|---|---|
| 4,702,491 | 10/1987 | Meyer | 280/808 |
| 4,840,404 | 6/1989 | Falterman | 280/808 |
| 5,074,589 | 12/1991 | Saji | 280/803 |
| 5,131,683 | 7/1992 | Johnson | 280/808 |

*Primary Examiner*—Kenneth R. Rice
*Attorney, Agent, or Firm*—MacMillan, Sobanski & Todd

[57] ABSTRACT

A seat belt construction is provided in which a first end of the seat belt is connected to the vehicle frame and a second opposite end is connected to the passenger seat so that it extends across and behind the back rest of the passenger seat to form a back restraint to prevent the passenger from being thrown rearwardly upon failure of the back rest.

20 Claims, 3 Drawing Sheets

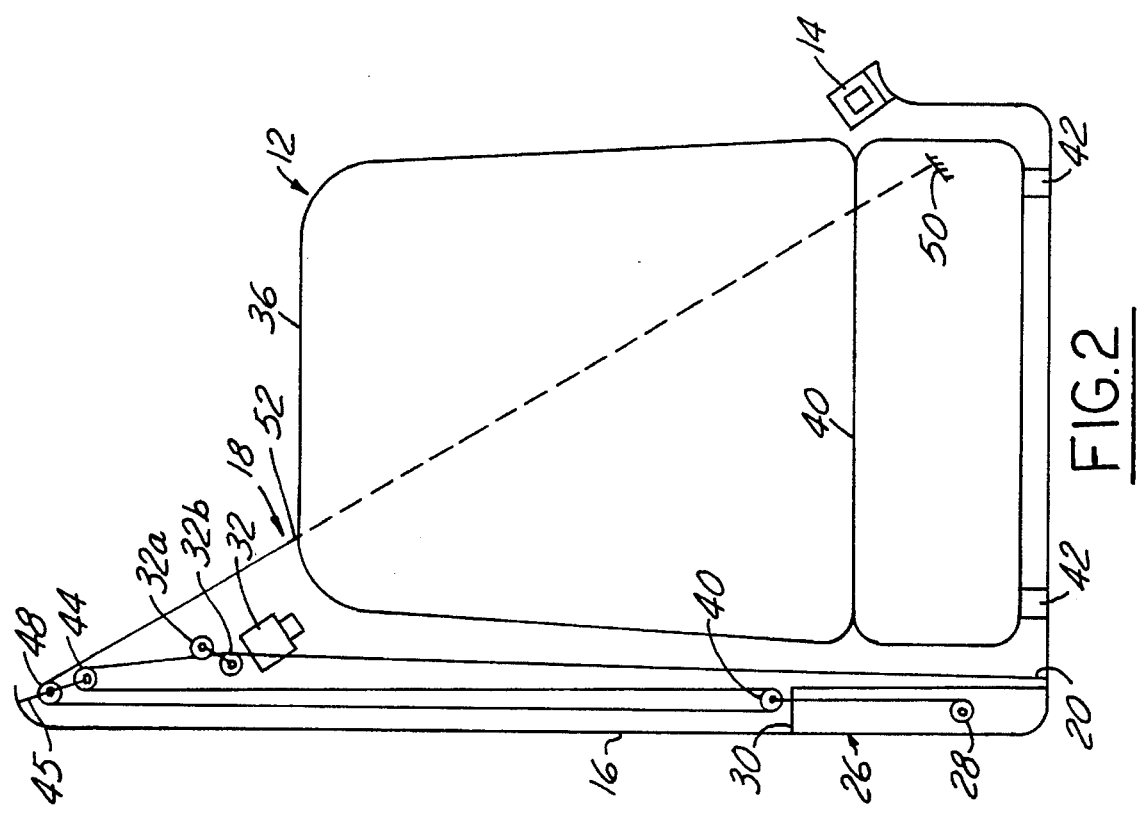
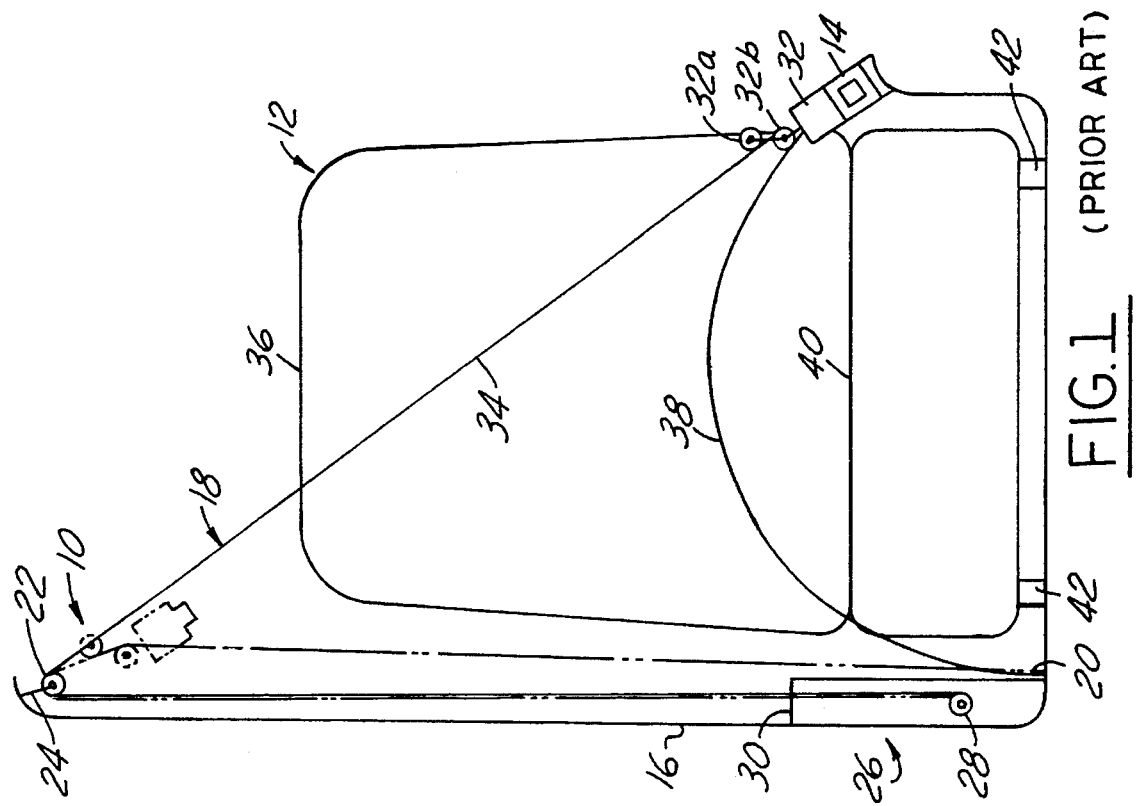

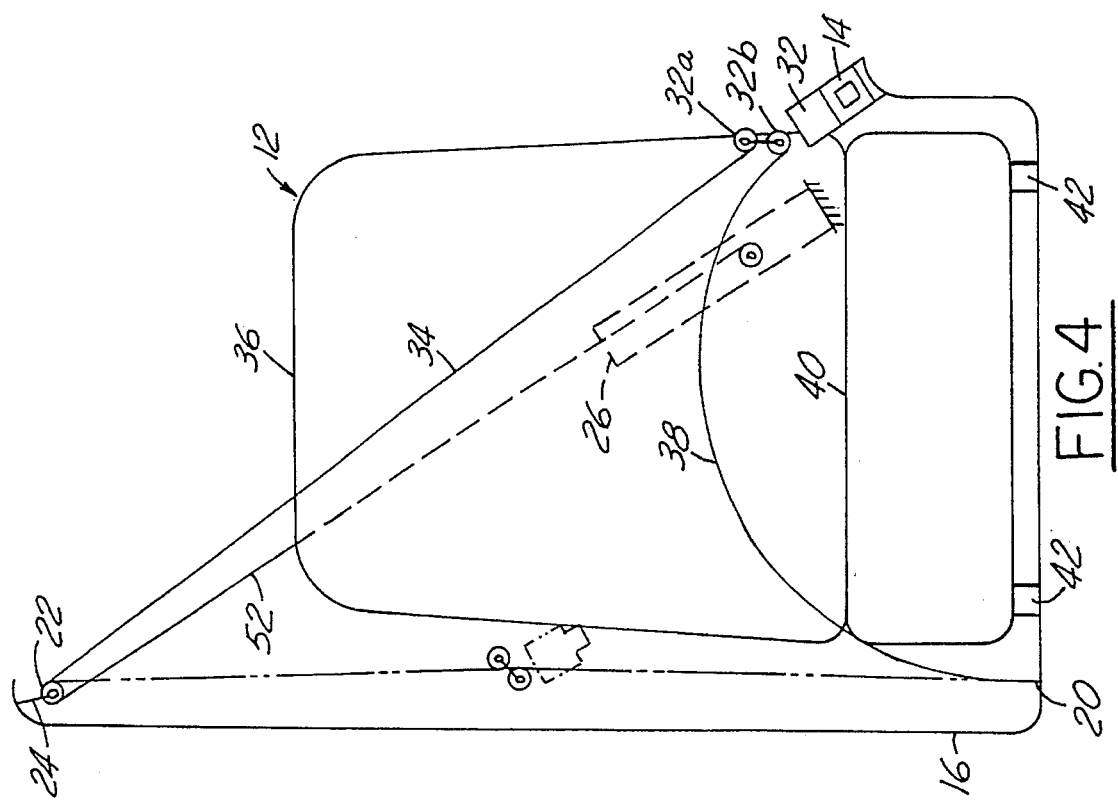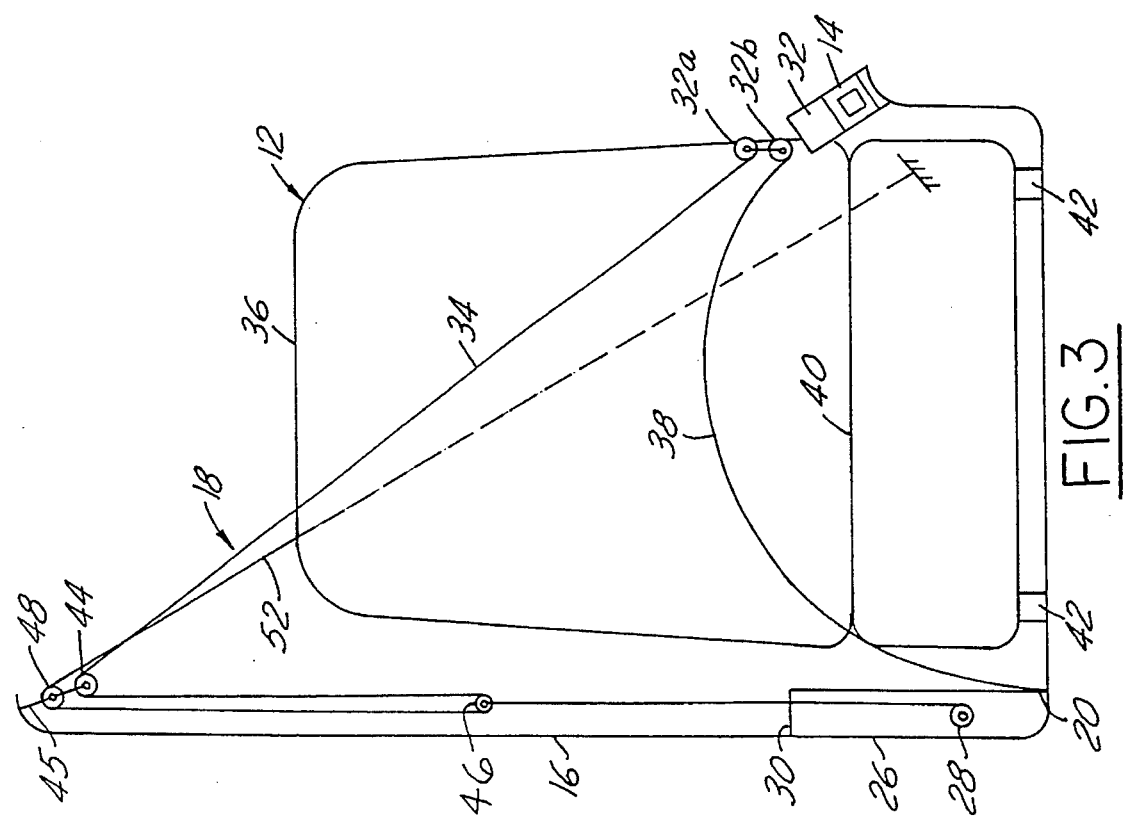

SEAT BELT CONSTRUCTION

FIELD OF THE INVENTION

This invention relates to a device for restraining a passenger in a vehicle seat, and more particularly to a seat belt construction that additionally supports and restrains the back rest of the seat.

BACKGROUND OF THE INVENTION

Passenger restraining lap/shoulder belts for automotive vehicles have been used for many years as a safety device to prevent injury to a passenger during an automobile accident. Lap/shoulder seat belts have been successful in saving many lives and preventing major injuries to the passenger. Typical seat belts include a lap belt which extends across the lap of the passenger and a shoulder harness that extends in front of and across a shoulder and the chest of the passenger. With this construction, the passenger is constrained from violent forward motion which would result due to an impact or collision. Generally, seat belts have a locking mechanism that is automatically activated when a seat belt is suddenly pulled. Thus, the passenger is safely constrained between the seat belt and the back rest of the passenger seat.

However, a problem still occurs when, for instance, during a rear end collision, the back rest of the passenger seat breaks or fails leaving the passenger free to be propelled rearwardly and subject to injury.

This invention seeks to overcome the above-mentioned problem by providing a seat belt construction that not only restrains the passenger in the forward direction, but also supports the back rest of the passenger seat to constrain the passenger in the rearward direction in the event that the back rest fails.

SUMMARY OF THE INVENTION

A seat belt construction is provided for restraining a passenger in both the forward and rearward direction in which the seat belt has a first end secured to the floor of the automobile or vehicle and a second end that extends across and behind the back rest of the passenger seat to the vehicle floor/frame. In a first embodiment, the second end of the seat belt is directly connected to the vehicle seat so that the seat belt extends across and behind the back rest. A seat belt retractor mechanism is connected to the vehicle at one side of the passenger seat and is operably connected to the seat belt to withdraw it during non-use. A seat belt buckle is connected to the vehicle floor at the opposite side of the passenger seat, and a latch or locking tab is connected to the seat belt in the normal manner so that during use, the passenger pulls the latch across and down to be inserted into the buckle. Thus, the seat belt is extended against the bias of the retractor over and under a plurality of rollers to securely restrain a passenger.

In a second embodiment, a simpler construction may be provided by connecting the seat belt retractor directly to and behind the back rest of the passenger seat and connecting the second end of the seat belt to the retractor, thus eliminating the need for the plurality of rollers.

In a third embodiment, a seat belt construction is provided for automobiles having an automatic seat belt.

Objects, features and advantages of this invention are to provide a seat belt construction that restrains the passenger in both the forward and rearward direction, that is safer than prior seat belt constructions in that it prevents possible passenger injury due to failure of the back rest of the passenger seat upon a rear end collisions, that is simple in construction, rugged, durable, reliable, quick and easy to use and of economical manufacture.

BRIEF DESCRIPTION OF THE DRAWINGS

These and other objects, features and advantages of this invention will be apparent from the following detailed description, appended claims and accompanying drawings in which:

FIG. 1 is a front schematic view of a passenger vehicle seat with a typical prior art seat belt construction;

FIG. 2 is a front schematic view of a passenger vehicle seat with the seat belt construction of the present invention shown in a retracted non-use position;

FIG. 3 is a front schematic view similar to FIG. 2 showing the seat belt in the extended in-use position;

FIG. 4 is a front schematic view of a passenger vehicle seat with a second embodiment of the seat belt construction with the seat belt shown in the retracted position in phantom.

DETAILED DESCRIPTION

Figure 5:
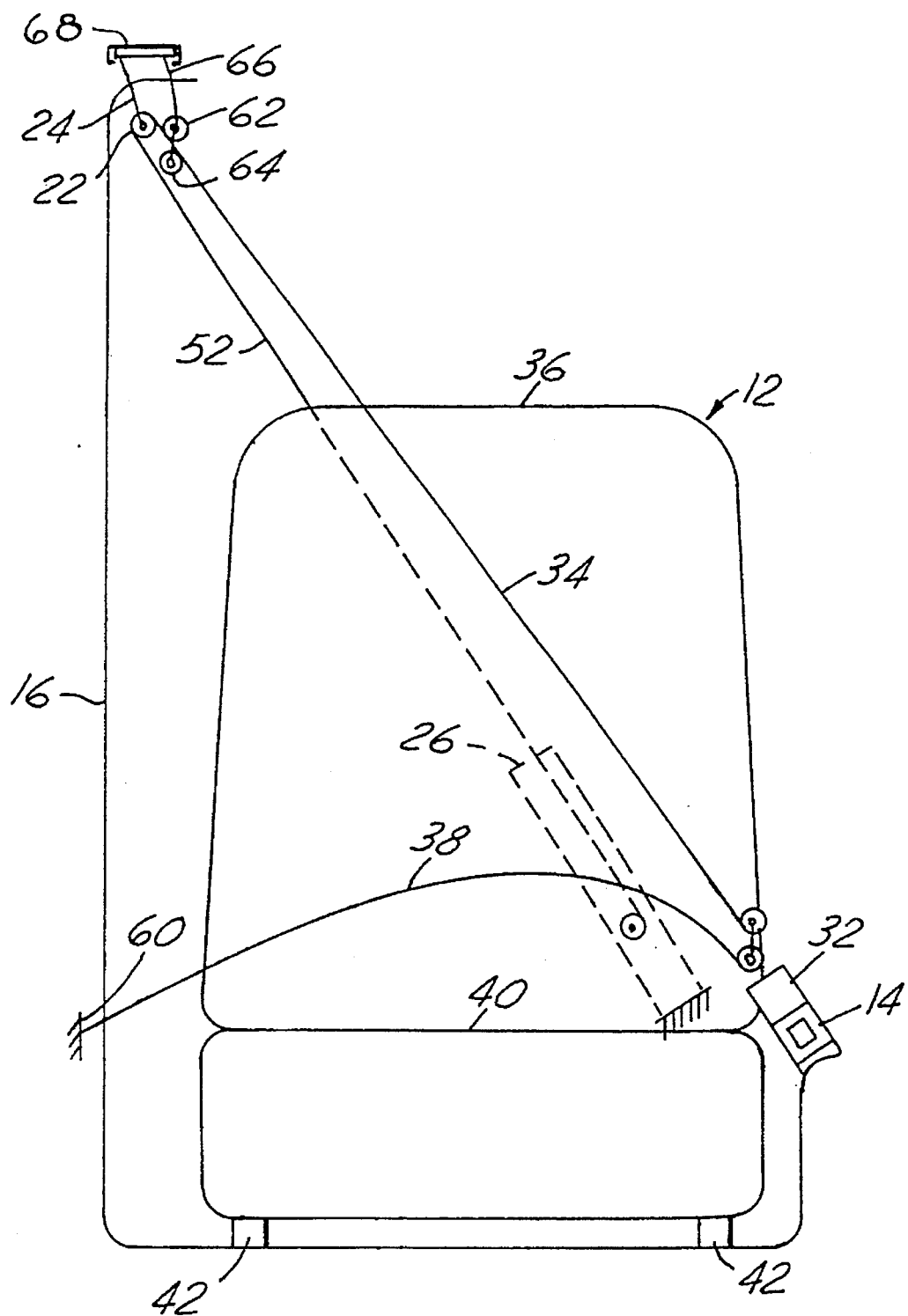
FIG. 5 is a front schematic view of a third embodiment of the seat belt construction for use with vehicles having automatic seat belts.

FIG. 1 shows a prior art seat belt construction 10 that has been pulled across a passenger seat 12 and fastened into a buckle 14 secured to the floor of a vehicle frame 16. The seat belt 18 (shown retracted in phantom) is typically connected at one end 20 to the floor of the vehicle frame 16 to extend up and over a roller 22 mounted to the vehicle frame 16 by a bracket 24. The opposite end of the seat belt 18 is connected to a seat belt retractor 26 mounted at one side of the passenger seat 12 to the vehicle frame 16. Typical seat belt retractors comprise a spring-biased reel 28 to which the second end of the seat belt 18 is connected to withdraw the seat belt to the retracted position during non-use. Typically, a locking or gripping mechanism (not shown) is provided in the retractor so that during use of the seat belt, any sudden forward pulling or jerking of the seat belt such as would normally occur during impact or collision causes the locking mechanism to automatically grip the seat belt to prevent movement and to restrain the passenger. The retractor 26 may be enclosed within a housing 30.

A latch 32 having a plurality of rollers 32a, 32b is operably connected to the seat belt 18 so that it extends between the two rollers.

In use, the passenger merely pulls the latch 32 down and across to be inserted and locked into buckle 14. This forms a shoulder strap 34 that restrains the passenger against the back rest 36 of the passenger seat and a lap belt 38 that restrains the passenger in the seat portion 40 of the passenger seat 12.

Typically, the passenger seat 12 is mounted on guides or rails 42 for adjustment in a forward and rearward direction to accommodate passengers of varying height.

FIGS. 2 and 3 show a first embodiment of the seat belt construction wherein the first end 20 of the seat belt is connected to the vehicle frame 16 and extends up and between the rollers 32a, 32b of the latch 32 as before. The belt extends up and over a first roller 44 mounted to the vehicle frame by a bracket 45. The belt 18 continues downwardly and around a second roller 46 connected to the spring-actuated retractor 26. The belt then extends upwardly, over and around a third roller 48 mounted to the vehicle frame 16 by the bracket 45. From the roller 48, the seat belt extends downwardly across and behind a central portion of the back rest 36 and is connected at 50 to the vehicle frame through the seat portion 40 of the passenger seat 12 to form a back restraint 52.

In use, the passenger merely grasps the latch 32 to pull the seat belt down and across to be inserted within the buckle 14 so that the belt is pulled against the bias of the retractor 26 to form a shoulder strap 34 and a lap belt 38. Thus, it can be seen that in the event of a collision or accident, the passenger would be restrained in the usual manner from being thrown forward by both the shoulder strap 34 and the lap belt 38. Similarly, if the back rest 36 fails, which might occur during a rear end collision, the passenger is prevented by the back restraint 52 from being thrown in a rearward direction.

FIG. 4 shows a second embodiment of the invention similar to the construction shown in FIG. 1 except that the retractor 26 is mounted to and behind the back rest 36. The seat belt is shown in a retracted position in phantom, and from that position is pulled down and across as before to form the shoulder strap 34 and lap belt 38. Thus, the belt extends from the shoulder strap up and over the roller 24 and across and down behind the back rest 36 to the retractor 26. The passenger is thus restrained from being thrown both forwardly and rearwardly in the same manner as previously described.

FIG. 5 shows a third embodiment of the invention for use in vehicles having an automatic seat belt. Basically, the seat belt construction is similar to that shown in FIG. 4 except that the lap belt 38 is attached to the vehicle door 60 at one end and is threaded through the latch 32 and integrally joined to shoulder strap 34. The latch 32 normally remains locked in the buckle 14. Of course, the shoulder strap and lap belt may be released by manually unlocking the latch from the buckle in the normal manner to release the passenger in the event of an emergency or in case the passenger is unable to open the door. The shoulder strap 34 is connected at one end to the retractor 26 in the manner previously described. The opposite end of the shoulder strap is threaded through the latch 32 and integrally joined to the lap belt 38. A pair of rollers 62,64 is mounted on a bracket 66 to be located one on each side of the shoulder strap. The bracket 66 is mounted within a track (68) in the frame 16 and moves therein in a direction perpendicular to the plane of the drawing by a motorized mechanism that is automatically actuated when the door is opened. As the bracket and rollers move, the shoulder strap is extended from the retractor 26 and pulled away from the back rest 36. Thus, when a passenger opens the door to enter the vehicle, the end of the lap belt 38 that is attached to the door is moved away from the seat portion 40 and the shoulder strap 34 is moved in the direction of the viewer by the rollers 62,64 to allow access to the seat. When the passenger is in the seat and closes the door, the bracket 66 moves rearwardly toward the back rest as the back restraint 52, shoulder strap 34 and lap belt 38 are retracted into the retractor 26 to comfortably restrain the passenger in the seat.

Thus, a seat belt construction has been disclosed which provides additional passenger safety by preventing the passenger from being thrown in a rearward direction due to failure of the back rest 36. The seat belt construction includes a back restraint passing across a central portion of the back side of the back rest 36 which is effective to support the back rest against substantial rearward movement and against substantial rotation about vertical and horizontal axes in the event of a failure of the back rest.

I claim:

1. A restraint for an occupant of a vehicle comprising:

a seat having a first side, a second side, a front surface, a back surface, and a back rest with a front surface and a back surface, said seat being mounted on a vehicle frame, a seat belt having opposed ends, a first end being secured to the vehicle adjacent the first side of said seat and a second end being secured to the back surface of said seat adjacent the second side thereof so that said seat belt forms a back restraint extending from the first side to the second side of said seat across the back surface of the back rest of said seat and supporting the back rest of said seat to constrain an occupant of said seat in the rearward direction in the event that the back rest of said seat fails, a latch connected to said seat belt at an intermediate portion thereof, a buckle mounted to releasably hold the latch adjacent the second side of said seat, and a seat belt retractor mounted on the vehicle and operably connected to said seat belt to retract said seat belt during non-use.

2. The restraint of claim 1 wherein the second end of said seat belt is connected directly to said seat.

3. The restraint of claim 2 wherein said retractor is mounted to the vehicle frame adjacent the first side of said seat.

4. The restraint of claim 3 comprising:

a first roller mounted to the vehicle frame, a second roller mounted to said retractor, a third roller mounted to the vehicle frame, wherein said seat belt extends from its first end connected to the vehicle frame up and over said first roller down and under said second roller and up and over said third roller to extend across the back surface of the back rest of said seat.

5. The restraint of claim 1 wherein the second end of said seat belt is directly connected to said retractor.

6. The restraint of claim 5 wherein said retractor is connected to the back surface of the back rest of said seat.

7. A lap/shoulder belt restraint system for an occupant of a vehicle seat having a seat portion affixed to a vehicle frame and a back portion mounted to said seat portion, said system comprising:

an elongated belt, a lockable retractor operatively coupling said belt to the vehicle frame, and first and second mating buckle segments, the first of said segments being coupled to the vehicle frame adjacent to and on one side of the seat portion and the second of said segments being carded by said belt, one end of said belt being affixed to the vehicle frame adjacent to the seat portion on an opposite side of the vehicle seat from said first buckle segment and the other end of said belt extending behind and across the back portion between the one side and the opposite side of the vehicle seat and being coupled to said frame through said vehicle seat adjacent the one side of the seat portion.

8. The lap/shoulder belt restraint system of claim 7 wherein said one end of said belt is affixed to a door of the vehicle frame so that when the door is opened, said belt is moved therewith to allow passenger access to the vehicle seat.

9. The lap/shoulder belt restraint system of claim 8 comprising at least two rollers located one on each side of said belt, each said roller being mounted on a bracket movable along the vehicle frame to displace said belt away from the vehicle seat to allow passenger access.

10. The restraint of claim 1 wherein said back restraint extends across a central portion of the rear surface of the back rest.

11. The restraint of claim 1 wherein said back restraint extends diagonally across the back surface of the back rest of said seat.

12. The restraint of claim 11 wherein said back restraint extends across a central portion of the back surface of the back rest of said seat.

13. The restraint of claim 1 wherein said buckle is affixed to the frame of the vehicle adjacent said seat.

14. The restraint of claim 1 wherein, when said latch is held by said buckle, said seat belt forms a shoulder strap extending diagonally from the second side of said seat to the first side of said seat across the front surface of the back rest of said seat.

15. The restraint of claim 14 further including a bracket connected to the frame of a vehicle, said bracket engaging both said shoulder strap and said back restraint.

16. The restraint of claim 15 wherein said back restraint and said bracket cooperate to support the back rest of said seat against rearward motion in the event that the back rest of said seat fails.

17. The restraint of claim 15 wherein said bracket contains a roller, and said seat belt is looped over said roller at the juncture of said shoulder strap and said back restraint.

18. The restraint of claim 16 wherein said bracket is mounted within a track in a vehicle frame.

19. A passenger restraint for an occupant of a vehicle comprising:

a passenger seat having a back rest with a front side, a back side, a first side, and a second side mounted on a vehicle frame, a seat belt having opposed ends, one end being secured to the vehicle adjacent the first side of the passenger seat and the second opposite end being secured directly to the back side of the passenger seat adjacent the second side thereof so that the seat belt forms a back restraint extending across and behind the back rest of the passenger seat, a latch connected to the seat belt at an intermediate portion thereof, a buckle mounted to the vehicle adjacent the second side of the passenger seat, a seat belt retractor mounted on the vehicle frame adjacent the first side of the passenger seat and operably connected to the seat belt to retract the seat belt during non-use, a first roller mounted to the vehicle frame, a second roller mounted to said retractor, and a third roller mounted to said vehicle frame, wherein said seat belt extends from its first end connected to the vehicle frame up and over said first roller down and under said second roller and up and over said third roller to extend across and behind the back rest of the passenger seat.

20. A restraint for an occupant of a vehicle comprising:

a seat mounted on a vehicle frame, a back rest for supporting the rear portion of the torso of an occupant sitting on said seat, said back rest having a back side, said back rest mounted on said seat to support said back rest in a generally upright position, and a seat belt fastened to said frame and forming a lap belt adapted to releasably pass over the lap of the occupant sitting on said seat, a shoulder strap adapted to releasably pass diagonally across the forward portion of the torso of the occupant sitting on said seat, said seat belt further including a back restraint passing across a central portion of the back side of said back rest and effective to support said back rest against substantial rearward movement and against substantial rotation about vertical and horizontal axes in the event of a failure of said back rest.

* * * * *

UNITED STATES PATENT AND TRADEMARK OFFICE
CERTIFICATE OF CORRECTION

PATENT NO. : 5,462,310
DATED : October 31, 1995
INVENTOR(S) : Miroslav Jaksic

It is certified that error appears in the above-identified patent and that said Letters Patent is hereby corrected as shown below:

Column 4, Claim 7, Line 10, after "being", change "carded" to
-- carried --.

Signed and Sealed this

Thirtieth Day of April, 1996

Attest:

BRUCE LEHMAN

Attesting Officer     Commissioner of Patents and Trademarks